(12) United States Patent
Davis

(10) Patent No.: US 12,004,454 B2
(45) Date of Patent: Jun. 11, 2024

(54) TARPING SYSTEM AND METHOD

(71) Applicant: Jesse Kay Davis, Fairview, OK (US)

(72) Inventor: Jesse Kay Davis, Fairview, OK (US)

( * ) Notice: Subject to any disclaimer, the term of this patent is extended or adjusted under 35 U.S.C. 154(b) by 575 days.

(21) Appl. No.: 17/209,161

(22) Filed: Mar. 22, 2021

(65) Prior Publication Data
US 2021/0289709 A1 Sep. 23, 2021

Related U.S. Application Data

(60) Provisional application No. 62/992,687, filed on Mar. 20, 2020.

(51) Int. Cl.
A01F 25/13 (2006.01)

(52) U.S. Cl.
CPC ................... A01F 25/13 (2013.01)

(58) Field of Classification Search
CPC .......... A01F 25/13; E04H 15/54; B60J 7/085; E04D 1/34; B60P 7/04
USPC ............................................. 52/4
See application file for complete search history.

(56) References Cited

U.S. PATENT DOCUMENTS

| | | | | |
|---|---|---|---|---|
| 4,483,127 A * | 11/1984 | Forkner | ................... | A01F 25/13 53/390 |
| 4,505,512 A * | 3/1985 | Schmeichel | ............. | B60J 7/085 160/238 |
| 4,691,957 A * | 9/1987 | Ellingson | ................. | B60J 7/085 220/314 |
| 5,579,794 A * | 12/1996 | Sporta | ................. | E04B 1/34347 135/90 |
| 5,765,901 A | 6/1998 | Wilken | | |
| 6,109,680 A * | 8/2000 | Horner | ..................... | B60J 7/085 296/100.11 |
| 6,206,448 B1 * | 3/2001 | Haddad, Jr. | .............. | B60J 7/085 296/100.01 |
| 6,672,643 B1 * | 1/2004 | Brodskiy | ................. | B60J 11/02 296/136.11 |
| 6,682,123 B2 * | 1/2004 | Burks | ...................... | B60J 11/02 160/370.22 |
| 7,281,752 B2 * | 10/2007 | Wiegel | ..................... | B60J 11/02 296/98 |
| 7,310,913 B2 * | 12/2007 | Pierce | ...................... | E04H 9/14 52/156 |
| 7,600,347 B2 * | 10/2009 | Lindstrom | ................ | E04H 9/14 52/155 |
| 7,600,949 B2 * | 10/2009 | Ruiz | ...................... | A01G 20/18 405/15 |

(Continued)

FOREIGN PATENT DOCUMENTS

CA 2392954 1/2004

Primary Examiner — Beth A Stephan
(74) Attorney, Agent, or Firm — Law Office of Mark Brown, LLC; Mark E. Brown

(57) ABSTRACT

A tarping system includes a tarp comprising a flexible, weather-resistant material. Multiple straps are connected to the tarp. A tarp storage reel assembly is placed on one side of an object be covered and is removably secured auger anchors. A strap take-up reel assembly is placed on the other side of the object to be covered and is removably secured by auger anchors. A method of tarping an object includes the steps of removably anchoring a tarp storage reel assembly and a strap take-up reel assembly on opposite sides of the object. A tarp is placed over the object and secured with the straps.

3 Claims, 11 Drawing Sheets

(56) References Cited

U.S. PATENT DOCUMENTS

| | | | | |
|---|---|---|---|---|
| 7,871,052 B2* | 1/2011 | Baum | | E04H 4/10 248/500 |
| 8,464,974 B2* | 6/2013 | Schillo | | B60J 7/085 242/403 |
| 8,820,717 B2* | 9/2014 | Shrader | | B66F 9/18 254/326 |
| 9,381,793 B2* | 7/2016 | Rettig | | B60P 7/0876 |
| 10,499,571 B2* | 12/2019 | Kitchen | | A01G 13/0287 |
| 2003/0140568 A1* | 7/2003 | Glynos | | A01F 25/13 52/4 |
| 2004/0045223 A1* | 3/2004 | Deskin | | E04G 21/28 52/3 |
| 2004/0261325 A1* | 12/2004 | Glynos | | A01F 25/13 52/4 |
| 2006/0153657 A1* | 7/2006 | Goulet | | B60P 7/0846 410/99 |
| 2006/0283531 A1* | 12/2006 | Eisenbarth | | A01F 25/13 150/154 |
| 2013/0062025 A1* | 3/2013 | Bromberek | | B65D 90/18 160/242 |
| 2013/0199738 A1* | 8/2013 | Lieze, Jr. | | B65F 1/16 160/245 |
| 2014/0117296 A1* | 5/2014 | Shrader | | B60P 7/0876 254/338 |
| 2014/0145466 A1* | 5/2014 | Reeder | | B60J 7/085 296/100.14 |
| 2019/0141902 A1* | 5/2019 | Reed | | A01F 25/13 52/3 |

* cited by examiner

TARPING SYSTEM AND METHOD

CROSS-REFERENCE TO RELATED APPLICATION

This application claims priority in U.S. Provisional Patent Application No. 62/992,687, filed Mar. 20, 2020, which is incorporated herein by reference.

BACKGROUND OF THE INVENTION

1. Field of the Invention

The present invention generally relates to tarping systems, and in particular to a tarping system for protecting items in outside environments from the elements.

2. Description of the Related Art

Protective coverings are well-known, and a wide variety of protective covering systems and methods have been developed for various items and applications. For example, in farming and ranching operations hay bales are commonly protected from the elements for future use and sale. Many farms and ranches have barns and other structures for this purpose. However, permanent structures constructed on site tend to be relatively expensive. Moreover, they lack portability, whereby the farmers and ranchers may have to construct new structures when they move or expand their operations.

Prior solutions for hay producers include putting up hay in round bales for storage outside without cover. However, the market value may be less as compared to rectangular bales stored in barns and under protective coverings. Moreover, round bales tend to be more expensive to ship. Hay can also be sold as it is produced, but the current price may be less than optimum. Selling inventory to make room for additional hay bales may also lead to reduced revenue, depending on current market values and other factors. Storing hay outside can compromise quality from exposure to the elements, which can denigrate its value.

Protective coverings for hay bales are generally a less expensive option than barns and other permanent structures. For example, tarps (which can be constructed of flexible plastic and synthetic materials, canvas, etc.) are commonly placed over hay bales at exterior locations for protection from the elements. However, placing tarps over hay bales, particularly large piles of many bales, can be difficult, time-consuming, ineffective and potentially dangerous for the workers. Such tarping methods typically require multiple anchors, ropes and straps. Moreover, placing the tarps in windy conditions, which are common in hay-growing regions, can be difficult.

Other applications for easily-deployable tarps include covering cotton bales, covering ground-stored grain piles and covering tent-like structures for protection from elements such as precipitation, wind and sunshine.

Heretofore there has not been available a tarping system and method with the advantages and features of the present invention. These advantages include: installation by one person; relatively secure protection from the elements; scalability; and portability.

SUMMARY OF THE INVENTION

In the practice of an aspect of the present invention, a tarping system is provided which includes a tarp or tarps, two or more anchor assemblies, a tarp storage reel assembly on at least one of the anchor assemblies and tarp anchor straps. A ratchet is provided on the anchor assemblies and is configured for tensioning the tarp over the hay. In practicing the method of the present invention, anchor assemblies are removably ground-anchored on opposite sides of a hay load (comprising one or more bales) location. The tarp storage reel assembly has a tarp rolled up on it. Multiple straps or ropes attached to the tarp can be thrown over the hay stack, and taken up on a take-up reel assembly of the other anchor assembly. With the tarp in position, it can be tensioned with the ratchet.

BRIEF DESCRIPTION OF THE DRAWINGS

The drawings constitute a part of this specification and include exemplary embodiments and aspects of the present invention and illustrate various objects and features thereof.

DETAILED DESCRIPTION OF THE PREFERRED EMBODIMENTS

I. Introduction and Environment

Figure 1:
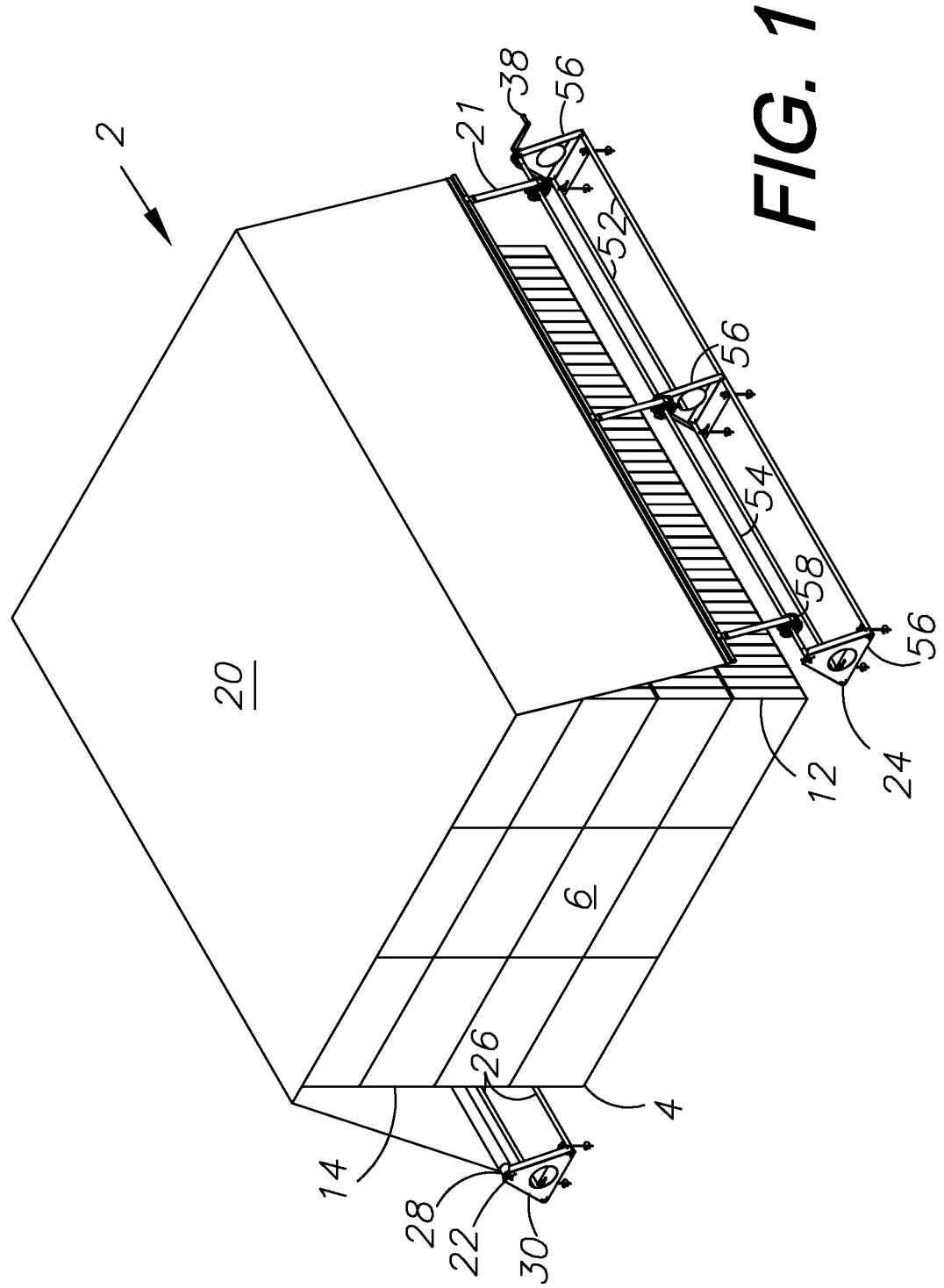
FIG. 1 is a perspective view of a tarping system embodying an aspect or embodiment of the present invention with the tarp placed over a pile of hay bales.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, base, front, back, right and left refer to the invention as oriented in the view being referred to. The words "inwardly" and "outwardly" refer to directions toward and away from, respectively, the geometric center of the embodiment being described and designated parts thereof.

II. Tarping System 2

Referring to the drawings in more detail, the reference numeral 2 generally designates a tarping system embodying an aspect or embodiment of the present invention. Without limitation, the system 2 is shown covering a hay pile 4, consisting of multiple individual hay bales 6 forming a box-like configuration with a top 8, a bottom 10, a front side 12, a back side 14, a first end 16 and a second end 18. The hay pile 4 can have other configurations, including a single bale and an additional bale or bales 6 on the top 8 to facilitate drainage by peaking a tarp 20 placed thereover.

The system numeral 2 generally includes the tarp 20, straps 21, a tarp storage reel assembly 22 and a strap take-up reel assembly 24. The tarp 20 can comprise any suitable flexible, whether-resistant material, including plastic, canvas, etc. Three straps 21 are shown attached to the tarp 20, although fewer or additional straps can be provided. Moreover, the straps 21 can be embedded in the tarp 20, attached thereto, fastened to a tarp edge, or separate.

Figure 9:
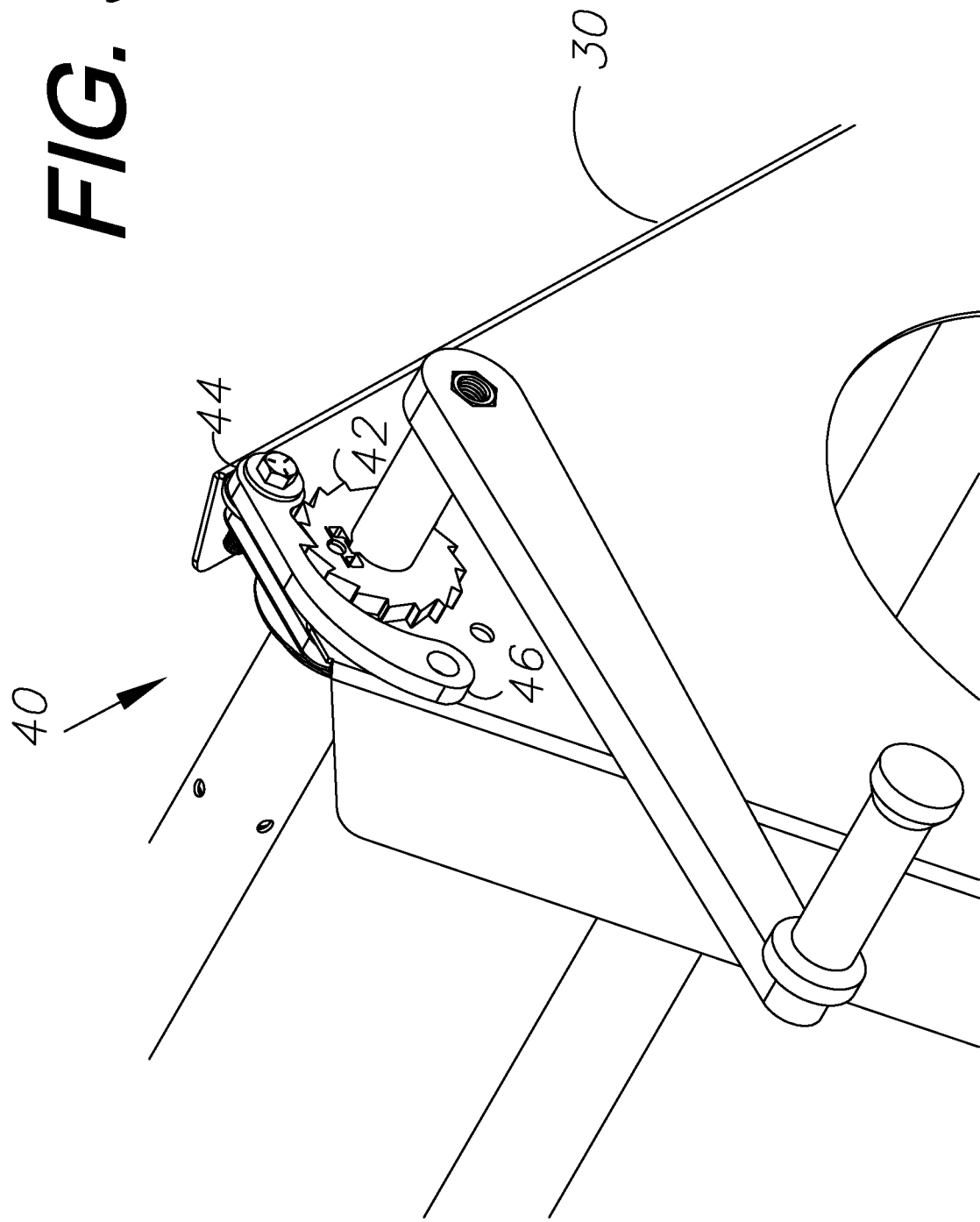
FIG. 9 is a fragmentary, perspective view thereof, showing the ratchet subassembly and an engaged, locked position.
Figure 10:
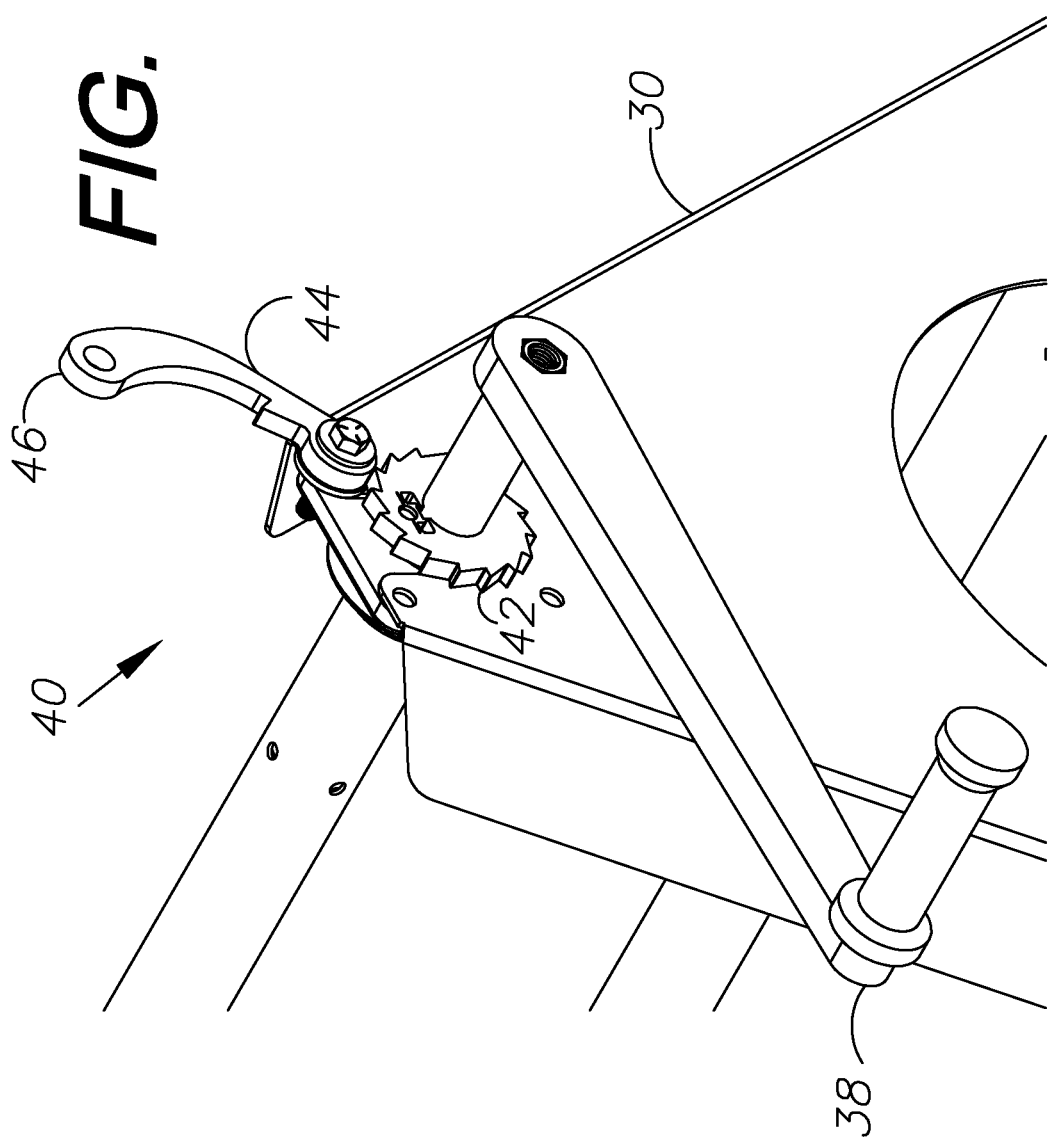
FIG. 10 is a fragmentary, perspective view thereof, with the ratchet subassembly in a disengaged, unlocked position.

The tarp storage reel assembly 22 includes a pair of longitudinal base tubes 26, an upper rotatable shaft 28 and generally triangular support plates 30 attached to the tubes 26 and the shaft 28. The tubes 26 are connected in parallel, spaced relation by base panels 32 with keyhole-shaped openings 34. Each plate 30 includes a bearing receiving the rotating shaft 28. A crank 38 is mounted on an end plate 30 and is drivingly connected to the upper shaft 28 for rotating same. The end plate 30 also mounts a ratchet subassembly 40 with a toothed wheel 42 selectively engaged by a pawl 44. The pawl 44 includes a weighted, distal end 46, which drops it into engagement with the teeth of the wheel 42 when released, whereby the ratchet subassembly 40 automatically locks (FIG. 9) unless the pawl is manually rotated to a raised, disengaged, unlocked position (FIG. 10).

The strap take-up reel assembly 24 includes a pair of longitudinal base tubes 52, and upper rotatable shaft 54 and generally triangular support plates (three are shown) 56 attached to the tubes 52 and the shaft 54. The rotatable shaft 54 for the strap take-up reel assembly 24 can be smaller in diameter than the rotatable shaft 28 of the tarp storage reel assembly 22 because the rotatable shaft 28 extends substantially the entire length of the tarping system and is supported at its ends by two support plates 30, whereas the rotatable shaft 54 is supported by three support plates 56. The shaft 54 mounts strap take-up spools 58 (e.g., three are shown). Keys 60 are attached to the shaft 54 and extend into the spools 58 to form a fixed, anti-rotation connection. Hex nuts 62 are secured to the spools 58 and threadably receive setscrews 63 for engaging respective keys 60 whereby the spools 58 are locked in place on the shaft 54 and prevented from sliding longitudinally.

III. Installation

Figure 2:
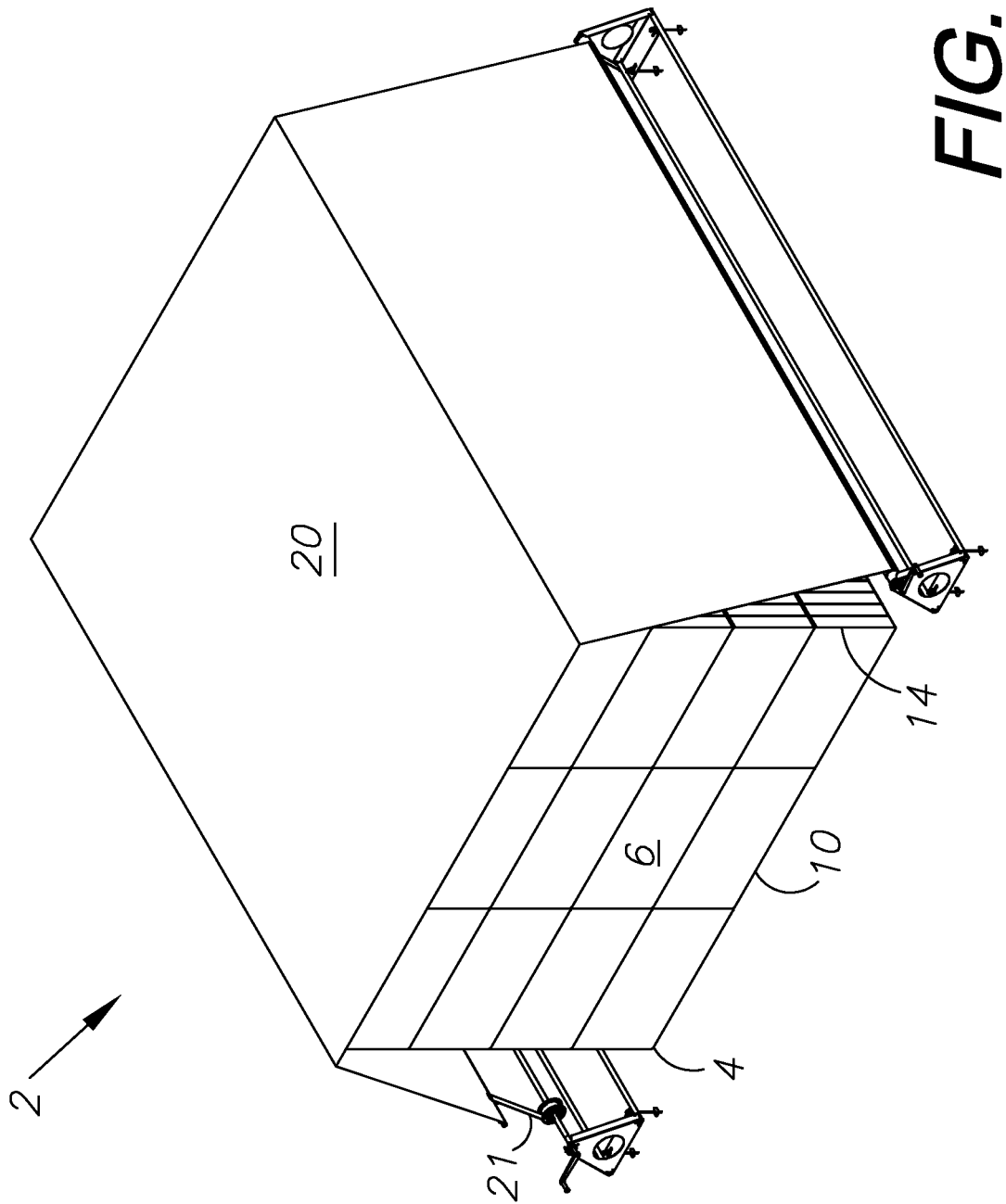
FIG. 2 is another perspective view thereof.
Figure 3:
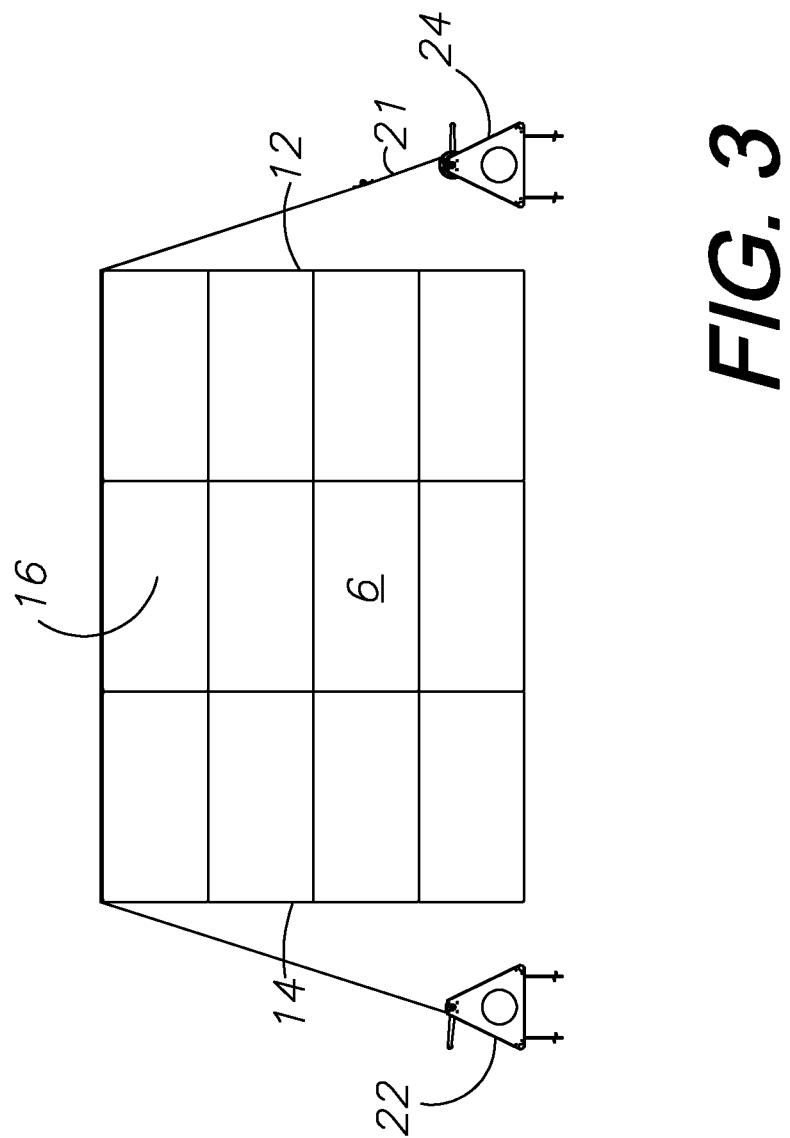
FIG. 3 is an end elevational view thereof.
Figure 4:
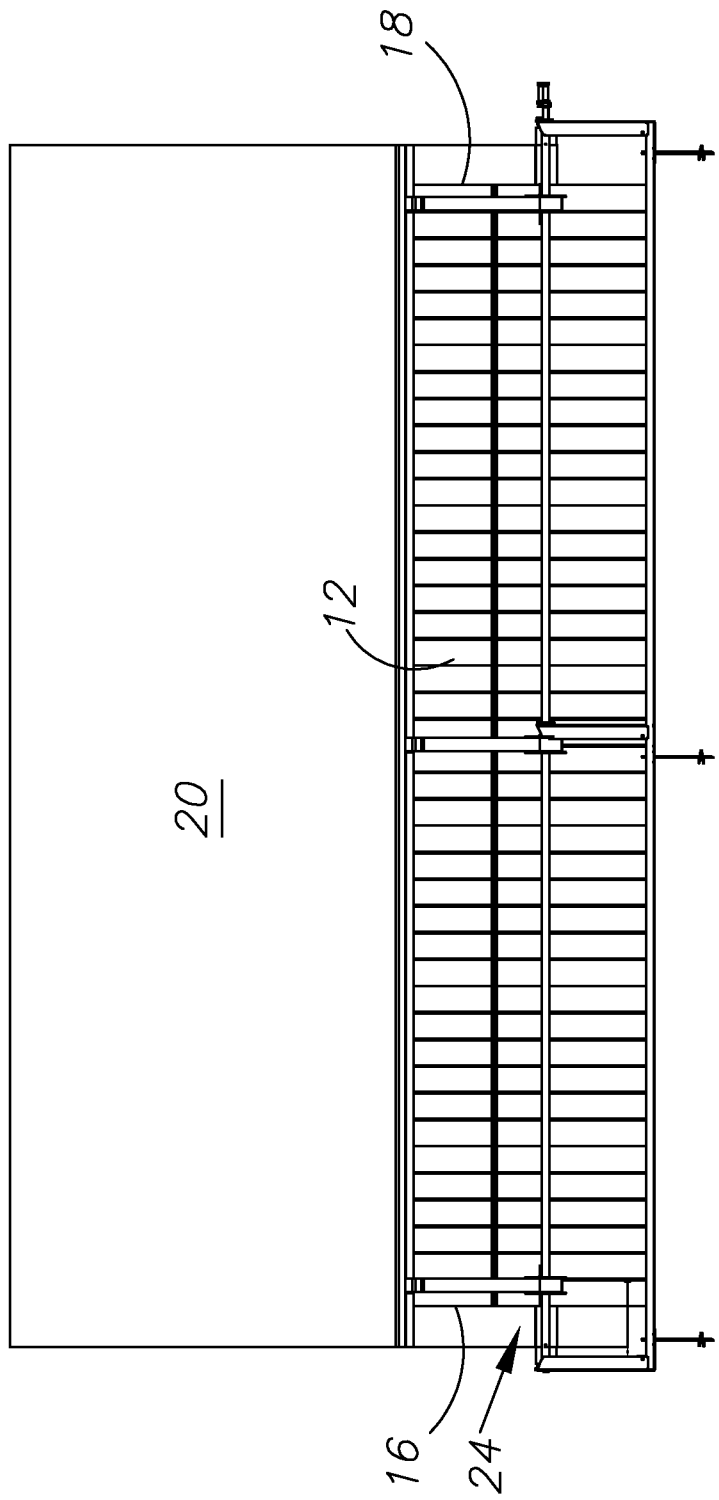
FIG. 4 is a front side elevational view thereof.
Figure 5:
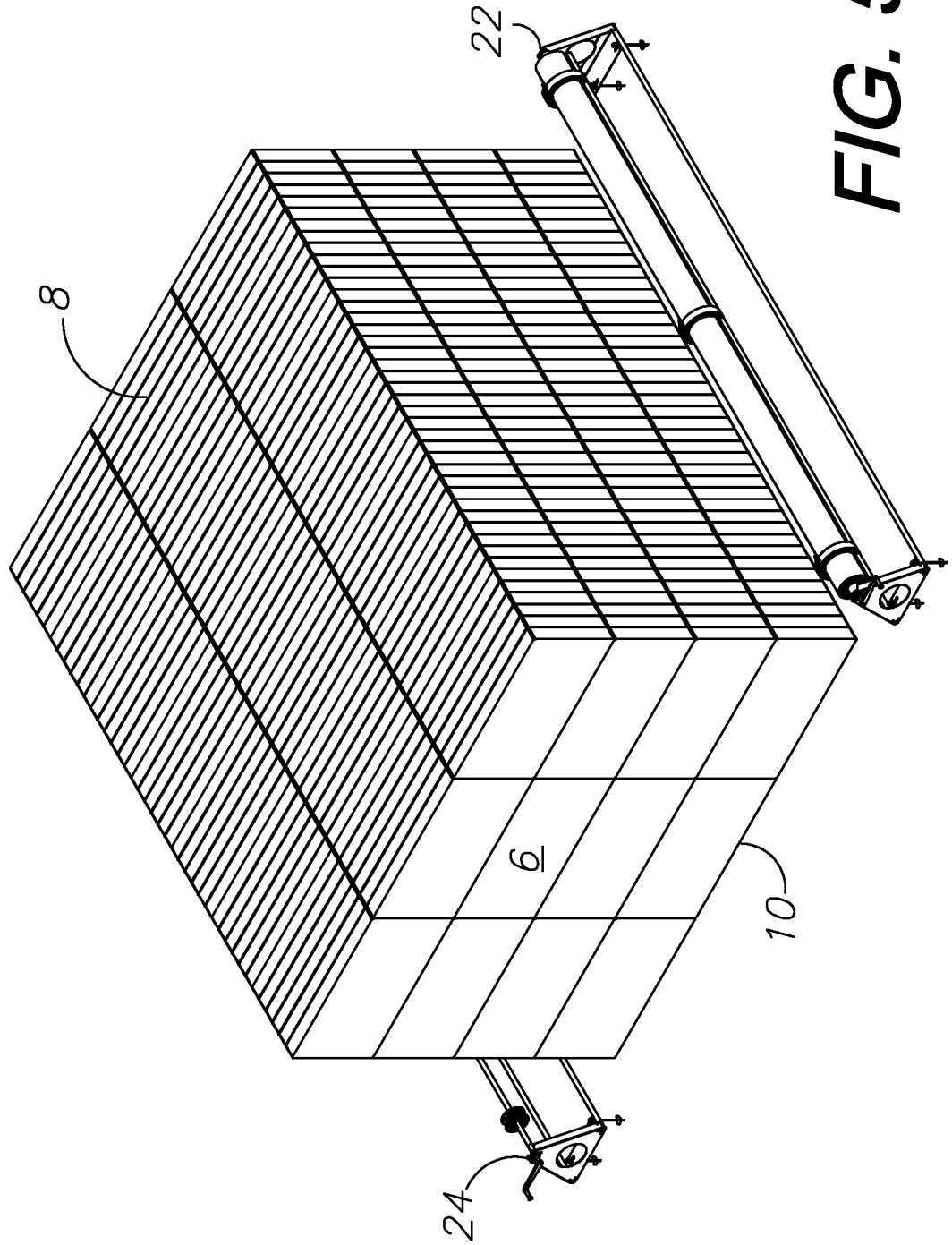
FIG. 5 is a perspective view thereof, with the anchor assemblies placed on two sides of a hay bale pile, shown before the tarp is deployed.
Figure 6:
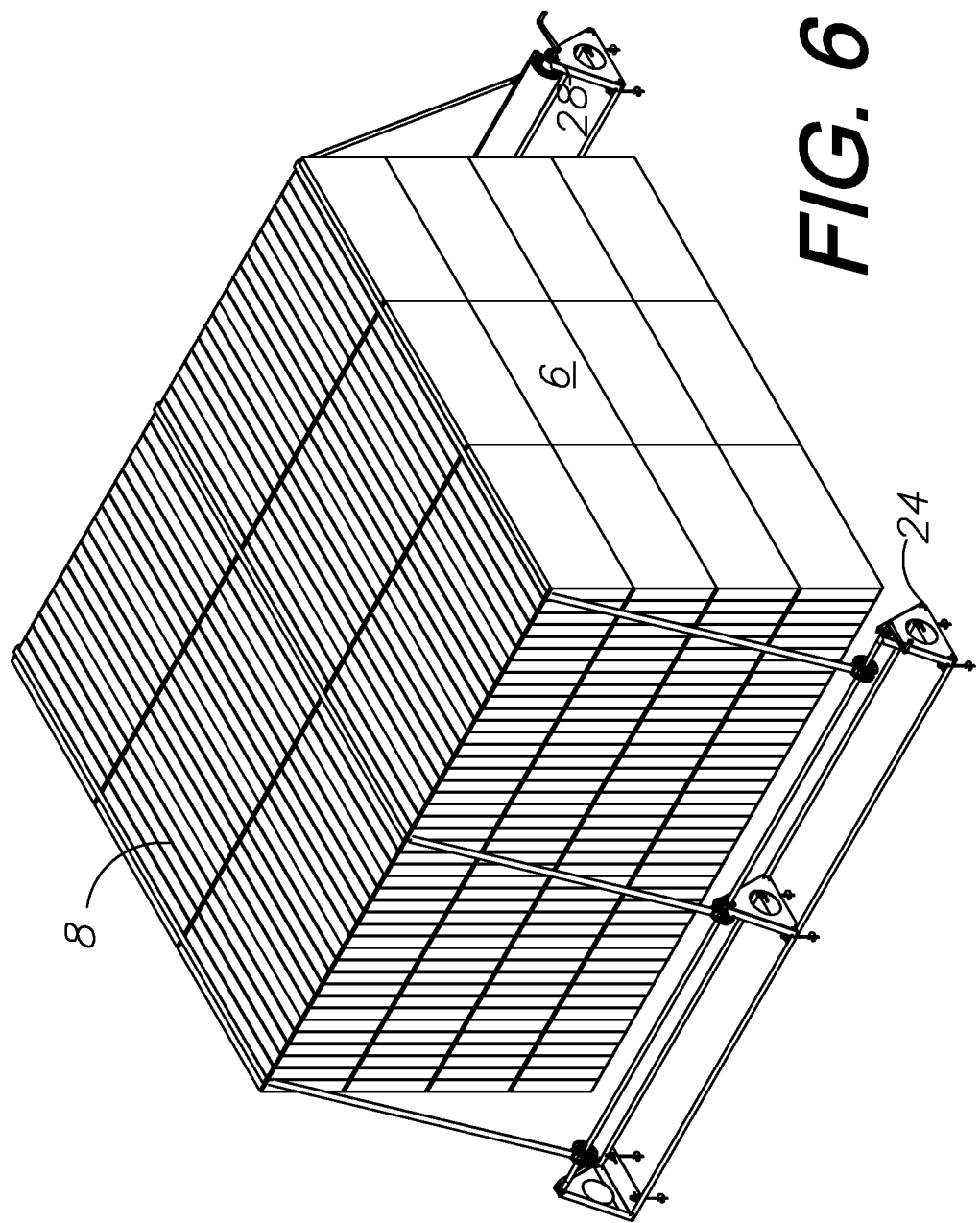
FIG. 6 a perspective view thereof with the straps deployed and the tarp omitted.
Figure 7:
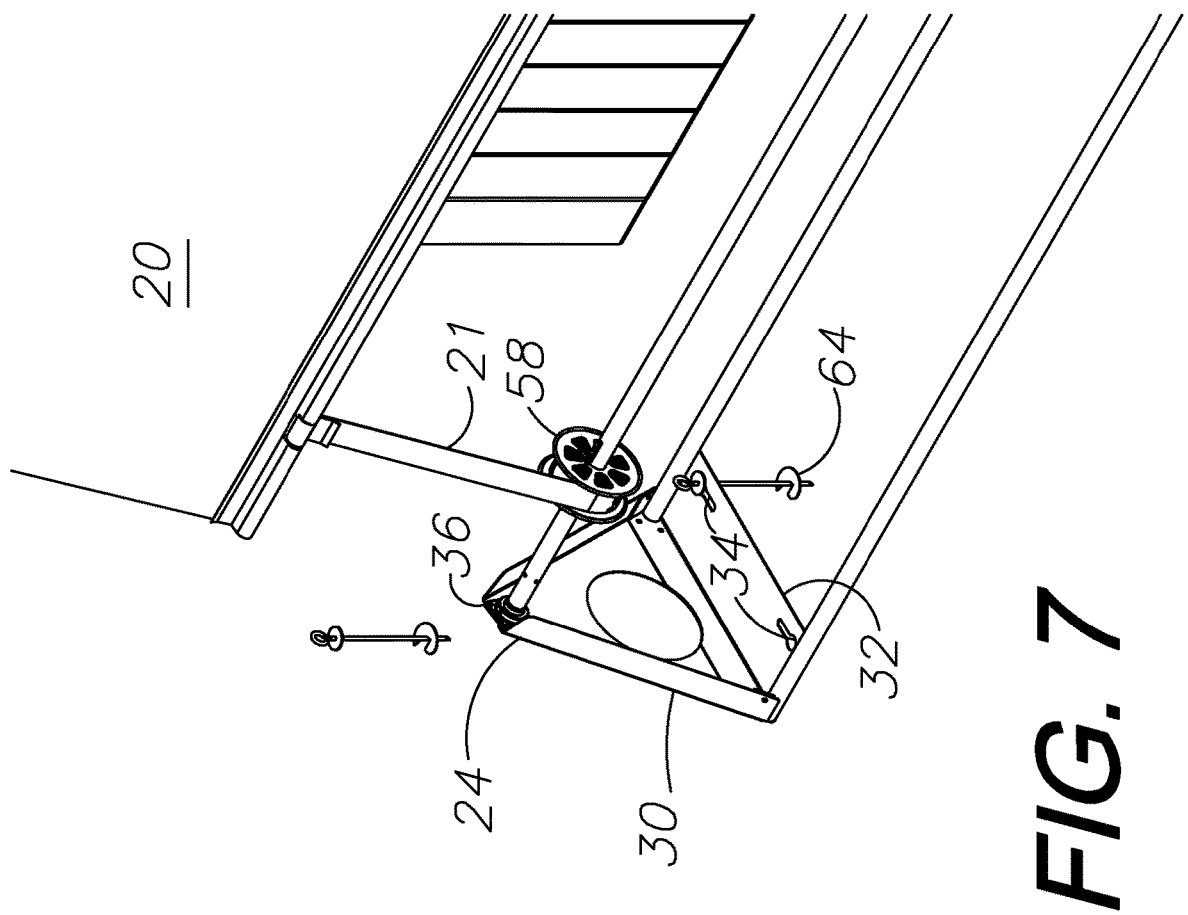
FIG. 7 is a fragmentary, perspective view thereof, showing an end of an anchor assembly.
Figure 8:
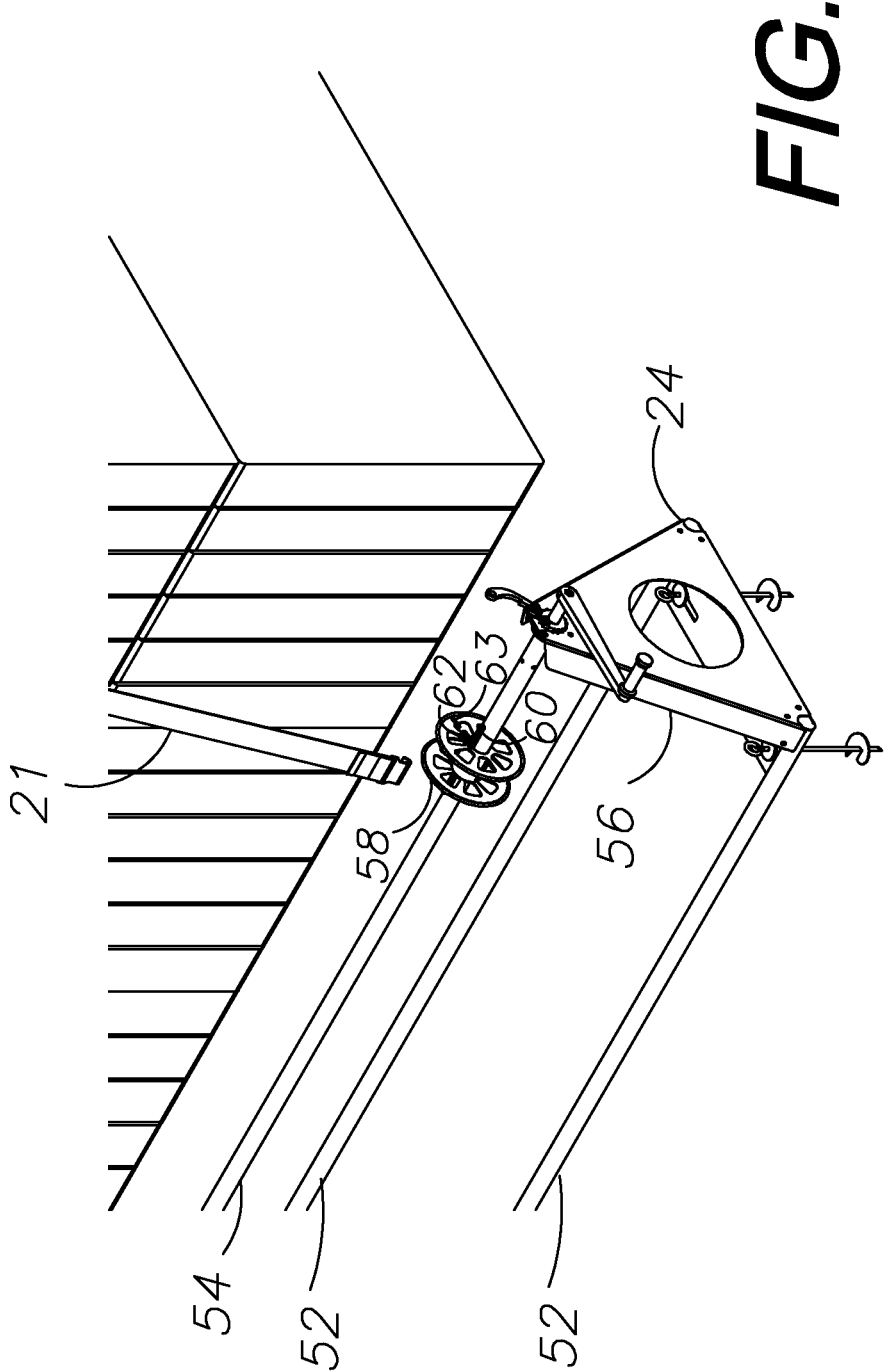
FIG. 8 is a fragmentary, perspective view thereof, showing another end of an anchor assembly with a ratchet subassembly.

The tarping system 2 can be installed by placing the tarp storage and the strap take-up reel assemblies 22, 24 on relatively flat ground. Screw-type auger anchors 64 are placed in the base panel openings 34 and screwed into the ground. The hay pile 4 is then deposited between the reel assemblies 22, 24. Straps 21 are extracted from the tarp storage reel assembly 22 and can be thrown over the hay pile 4 for attachment to the strap take-up reel assembly 24. Turning the strap take-up reel assembly 24 (e.g., with the crank 38 or a suitable wrench) pulls the tarp 20 over the top of the hay pile 4 to its final, installed position shown in FIGS. 1 and 2.

The tarping system 2 can be removed, stored or relocated by rolling up the tarp 4 on the tarp storage reel assembly 22 and extracting the auger anchors 64.

IV. Modified or Alternative Embodiment, Tarping System 102

Figure 11:
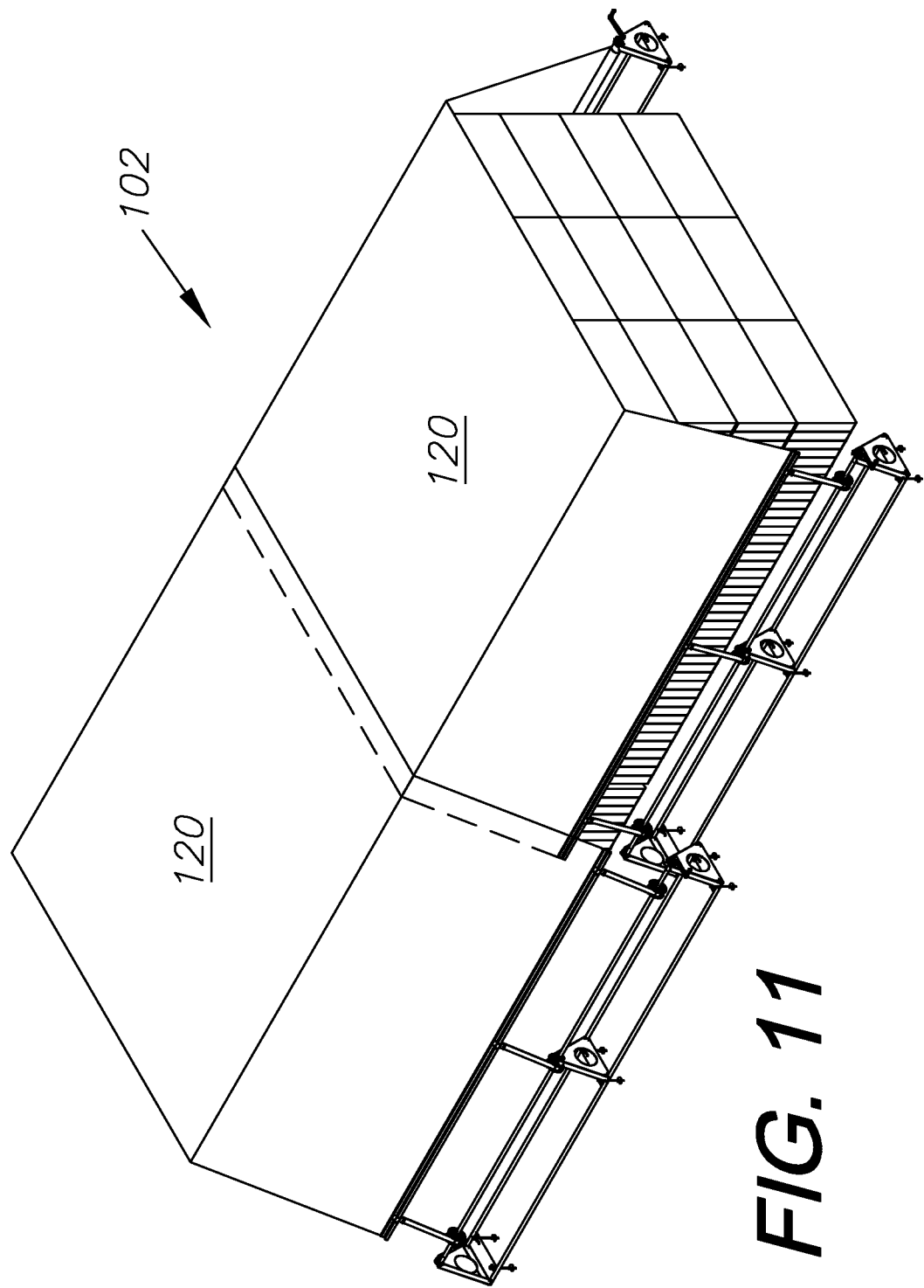
FIG. 11 is a perspective view of an extended tarping system comprising a modified or alternative embodiment of the present invention with two tarping systems placed end-to-end.

FIG. 11 shows a modified or alternative embodiment tarping system 102 with two tarps 120, two tarp storage reel assemblies 122 and two strap take-up reel assemblies 124 positioned end-to-the end. The tarps 120 overlap at their adjacent ends weather protection. Additional tarping systems can be placed end-to-end to accommodate farm, ranch and other applications as needed.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A tarping system for covering an object with first and second sides, opposite ends, a bottom and a top on a ground surface, said tarping system includes:
    a tarp with first and second sides, opposite ends and straps extending from said second side;
    a tarp storage reel assembly configured to extend along said object first side and including: a storage base configured for mounting on a ground surface; multiple storage support plate attached to said storage base and extending upwardly therefrom; a tarp storage shaft rotatably mounted on said storage support plates and extending between the storage support plates; and said tarp being configured for winding up on said tarp storage shaft in a wound, storage configuration and extending from said tarp storage shaft in an unwound, deployed configuration extending over the top of and covering said object; and
    a strap take-up reel assembly configured to extend along said object second side and including: a strap base configured for mounting on a ground surface; multiple strap support plates attached to said strap base and extending upwardly therefrom; a strap take-up shaft rotatably mounted on said strap support plates and extending between the strap support plates; said strap take-up shaft being configured for winding said straps thereon with said tarp in an unwound, deployed configuration extending over the top of and covering said object.

2. The tarping system according to claim 1, which includes:
    said strap take-up-reel assembly including a pawl-and-ratchet assembly connected to said strap take-up shaft and having a locked configuration retaining said straps in tension for securing said tarp over said object; and a release configuration enabling said tarp to be wound on said tarp take-up shaft.

3. The tarping system according to claim 2, which includes:
    multiple ground anchors configured for connection to said storage base and said storage base; and
    said anchors configured for embedding in said ground surface for anchoring said bases thereon.

* * * * *